Patented Feb. 1, 1944

2,340,833

UNITED STATES PATENT OFFICE 2,340,833

FUSION PROCESS FOR THE PRODUCTION OF ADDITION COMPOUNDS OF DIARYL GUANIDINES

Arnold R. Davis, Old Greenwich, Conn., assignor to American Cyanamid Company, New York, N. Y., a corporation of Maine No Drawing. Application December 21, 1940, Serial No. 371,207

3 Claims. (Cl. 260—429)

This invention relates to a process for the production of glassy, resin-like, amorphous addition compounds from diaryl guanidines. The addition compounds produced in accordance with the process of the present invention may be used as delayed action activators for diaryl guanidine activatable accelerators in the vulcanization of rubber.

In my co-pending application, Serial No. 351,156, filed August 3, 1940 (Patent No. 2,259,063 issued October 14, 1941), I have described and claimed a process for producing glassy, resin-like, amorphous diaryl guanidine-zinc chloride addition compounds in which the diaryl guanidine is heated with zinc chloride to fusion.

I have now found that somewhat similar addition compounds in the form of glassy, resin-like, amorphous products may be prepared when zinc oxide is fused with a diaryl guanidine hydrochloride.

In the practice of the invention, the diaryl guanidine, for example, diphenyl guanidine or diorthotolyl guanidine, is first combined with its molecular equivalent of hydrogen chloride to form the diaryl guanidine hydrochloride. The hydrochloride is then heated to fusion with the zinc oxide and in molecular combining proportions, i. e., two moles of the diaryl guanidine, HCl to each mole of zinc oxide. In conducting the fusion, heating to temperatures at which the diaryl guanidine is decomposed should be avoided.

The hydrochloride of the diaryl guanidine may be prepared in any suitable manner, for example by crystallizing it from a substantially neutral solution of the diaryl guanidine and hydrochloric acid.

The invention is illustrated by the following example to which, however, it is not to be limited and in which the parts are by weight.

Example 40 parts of diorthotolyl guanidine hydrochloride crystallized from a neutral solution of diorthotolyl guanidine and hydrogen chloride was ground with 5.91 parts of powdered zinc oxide. The mixture was heated in 20 minutes to 140° C. and held between 130–140° C. for 50 minutes and then heated in five minutes to 165° C. and poured onto a glass plate to cool. The product which was glassy, resin-like and amorphous, was ground to a powder.

A sample of the product of the example was then tested in the vulcanization of rubber in comparison with an equivalent amount of the amorphous diorthotolyl guanidine-zinc chloride addition compound prepared by dissolving the zinc chloride in alcohol, adding the diorthotolyl guanidine in solid form thereto, refluxing the mixture to bring about reaction between the materials, and distilling off the alcohol until a substantially dry and fused mass is obtained, as is described in my co-pending application, Serial Number 351,155, filed August 3, 1940 (Patent No. 2,259,414 issued October 14, 1941). The rubber mix contained benzothiazyl disulfide as the accelerator. The tests showed the product of the example and the product of the alcohol process to give essentially the same rate of set-up and good dispersion in the rubber, and the tensile tests showed them to give the same cured product.

Suitable changes may be made in carrying out my invention without departing from the spirit and scope thereof.

What I claim is:

1. A process of producing a resin-like, amorphous addition compound which comprises heating to fusion a non-aqueous mixture of diaryl guanidine hydrochloride and zinc oxide.
2. The process of claim 1, in which the diaryl guanidine is diphenyl guanidine.
3. The process of claim 1, in which the diaryl guanidine is diorthotolyl guanidine.

ARNOLD R. DAVIS.